Oct. 28, 1969　　　MITSUO FUJII ETAL　　　3,475,591
APPARATUS FOR ELECTRICALLY PERFORATING CIGARETTE PAPERS
Filed Feb. 29, 1968　　　　　　　　　　5 Sheets-Sheet 1

Mitsuo Fujii
Chitoku Kumagai
Zenji Katogata
Seiichi Inoue
　　INVENTORS

BY George B. Auyroth

Attorney

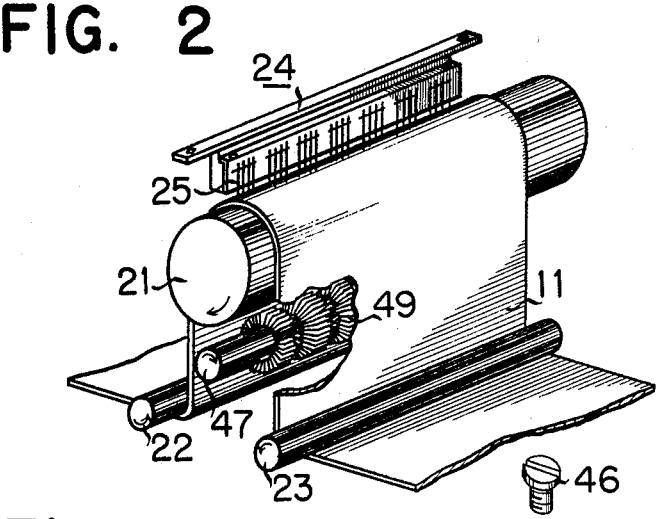
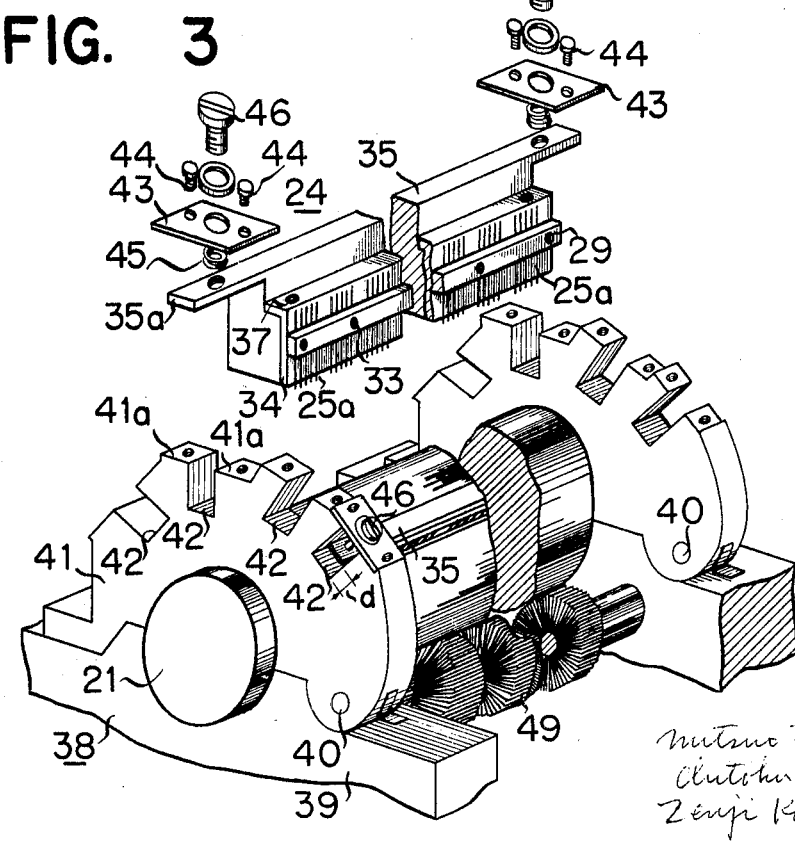

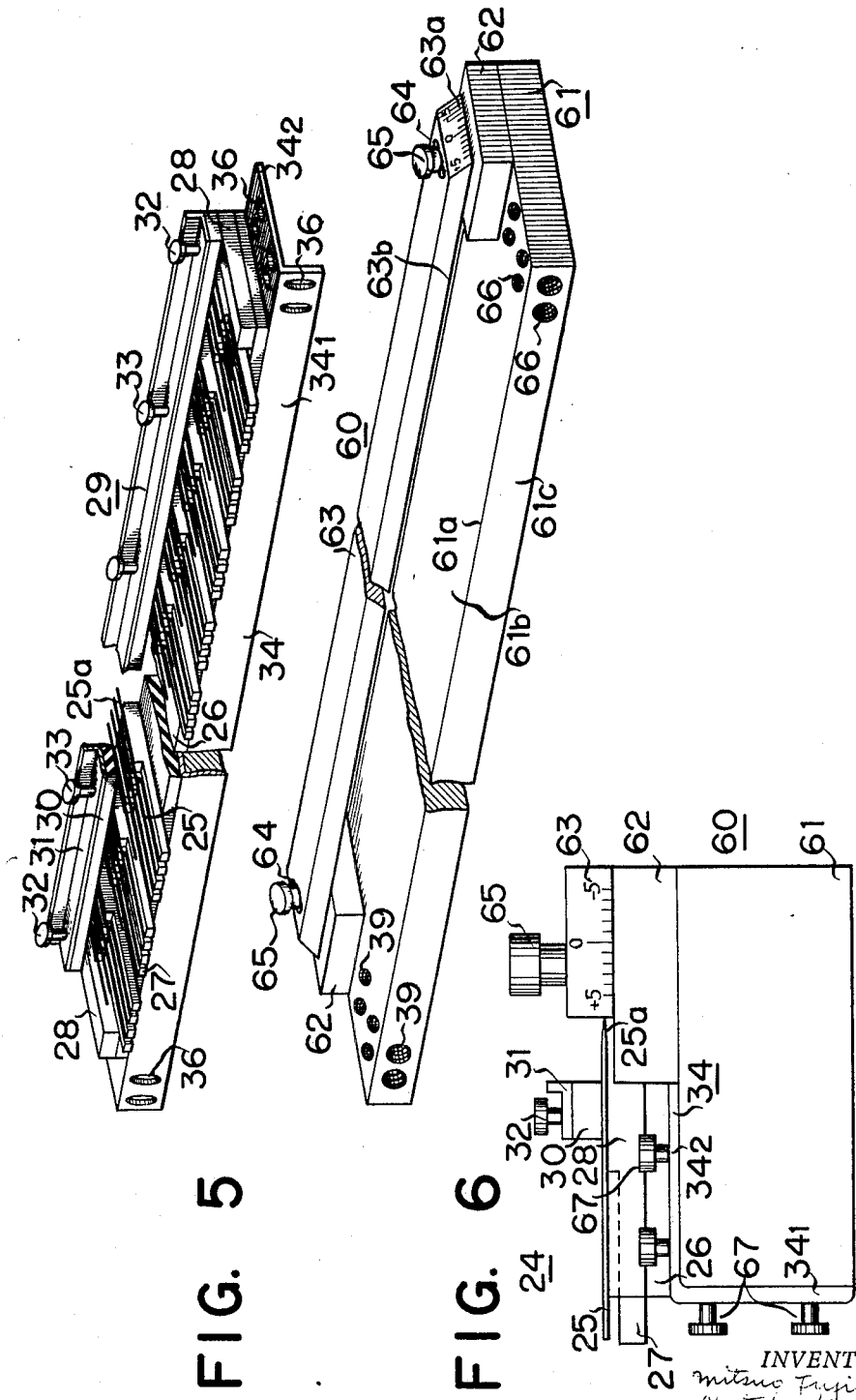

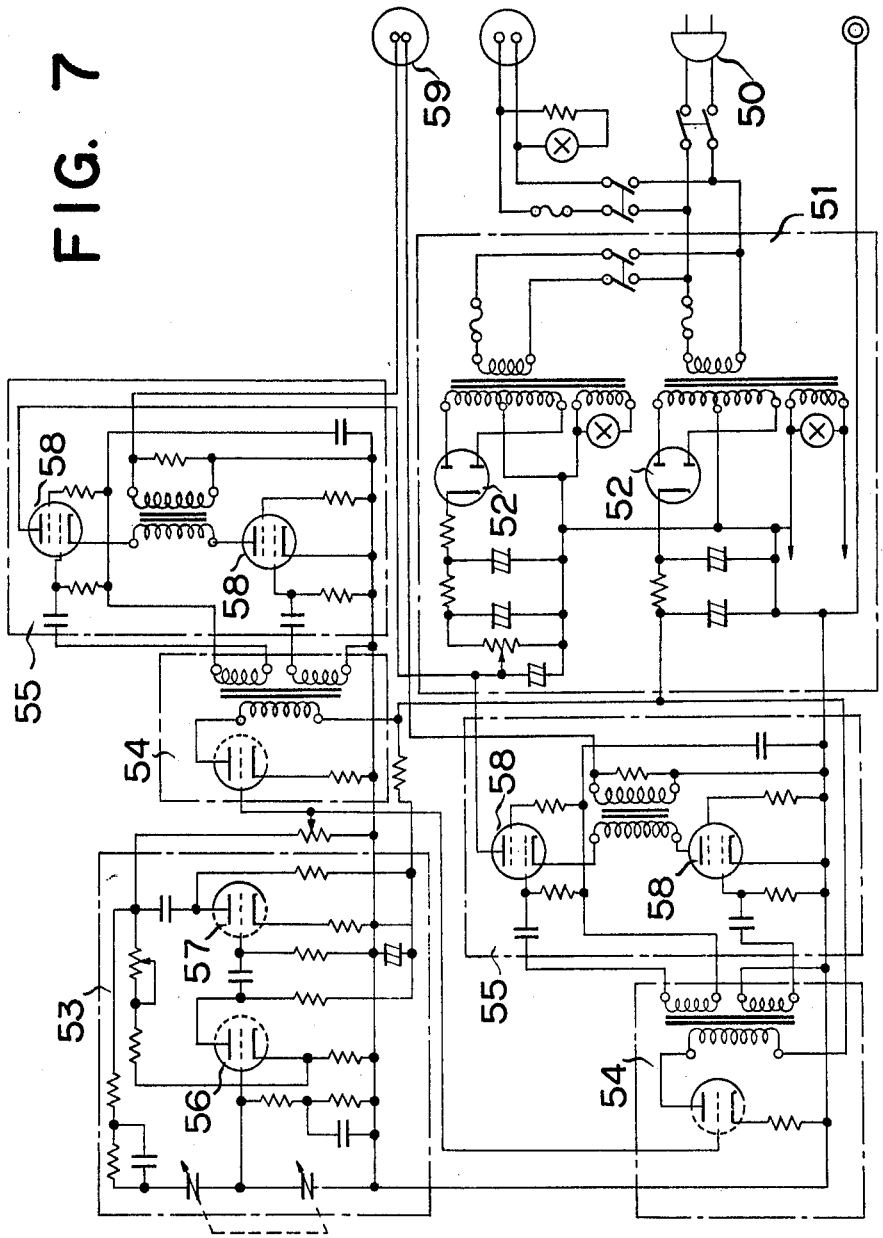

United States Patent Office 3,475,591
Patented Oct. 28, 1969

3,475,591
APPARATUS FOR ELECTRICALLY PERFORATING CIGARETTE PAPERS
Mitsuo Fujii and Chitoku Kumagai, Tokyo, Zenji Katagata, Kawasawi-shi, and Seiichi Inoue, Shizuoka-ken, Japan, assignors to Fujikawa Paper Mfg. Co., Ltd., Fukikawa-machi, Ihara-gun, Shizuoka-ken, Japan, a corporation of Japan
Filed Feb. 29, 1968, Ser. No. 709,454
Claims priority, application Japan, Mar. 3, 1967, 42/13,365, 42/13,366, 42/13,367, 42/13,368, 42/13,369, 42/13,370, 42/17,614
Int. Cl. H05b 7/18; H01j 1/44
U.S. Cl. 219—384                                     8 Claims

ABSTRACT OF THE DISCLOSURE

Apparatus for electrically perforating numerous pin holes through a cigarette paper comprises a cylindrical electrode around which the paper is passed and at least one multi-needle electrode assembly disposed spaced apart and in parallel relationship with the cylindrical electrode. The needle electrodes are disposed in the radial direction of the cylindrical electrode and a high voltage impulse voltage is impressed across needle electrodes and cylindrical electrode to create electric discharge thereacross thus perforating numerous pin holes through the cigarette paper.

---

This invention relates to a novel method and apparatus for electrically perforating cigarette papers and more particularly to a method and apparatus for electrically perforating a plurality of minute pin holes through a web of cigarette paper by means of an electric discharge such as corona discharge.

Various perforating apparatus have been known such as those disclosed in the United States Patent Nos. 1,790,452 and 2,372,508. However, as the apparatus disclosed in these patents were not devised for perforating a number of pin holes through cigarette papers, they had defects such that when perforating cigarette papers boundaries of the pin holes became burned or charred.

The purpose of providing pin holes for cigarette papers is to suck a small amount of surrounding air into the cigarette when using it whereby to dilute the concentration of the smoke sucked into the human body and to impart a high degree of porosity to the paper thus assisting the combustion of the tobacco and enjoying the aroma. Therefore, conventional apparatus having a tendency to burn or char the boundaries of the perforations are of less commercial value. Further, when imparting a high degree of porosity to the paper, it is desirable to limit the diameter of pin holes within a range of from about 10 to 60 microns, to make the configuration of the pin holes to be a true circle and to make constant their number in view of the desirability of not decreasing the tensile strength of the paper and improving the printing ability. For these reasons, the prior art apparatus could not perforate cigarette papers in a manner to satisfy the above described requirements.

Accordingly, it is an object of this invention to provide a novel method and apparatus for perforating cigarette paper which can form minute performations without impairing the inherent characteristics of the paper and without causing burning or charring thereof.

Another object of this invention is to provide a novel perforating method and apparatus which can form a number of perforations to provide a high degree of porosity without decreasing the tensile strength of the paper.

Still further object of this invention is to provide a new and improved perforating method and apparatus which can form pin holes of true circular configuration having a very small diameter of the order of 10 to 60 microns, for example.

A further object of this invention is to provide a perforating method and apparatus which can form pin holes through a continuously moving cigarette paper.

The foregoing objects and other objects as well as characteristic features of this invention will become more apparent and more readily understandable from the following detailed description and the appended claims when taken in conjunction with the accompanying drawings in which:

FIG. 2 is a perspective view, partly broken away, of an electrode means and certain portions associated therewith;

FIG. 3 is an exploded view of the electrode means shown in FIG. 2 and the mounting arrangement thereof;

FIG. 5 is a perspective view of said multi-needle electrode assembly and an adjusting tool to adjust the setting of the needle electrodes;

FIG. 6 is a side view helpful to explain the operation of the adjusting tool;

FIG. 7 shows an electrical connection of a high voltage impulse generator;

Figure 1:
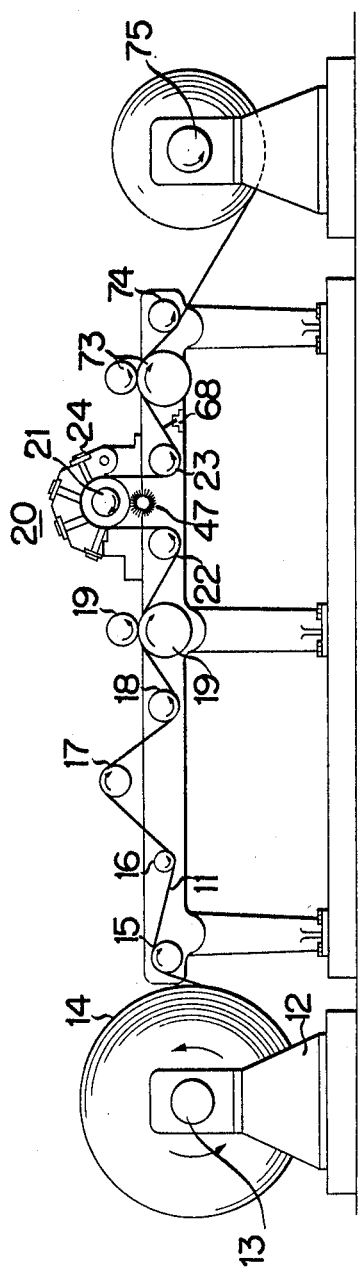
FIG. 1 is a side elevational view of the entire apparatus embodying this invention.
Figure 4:
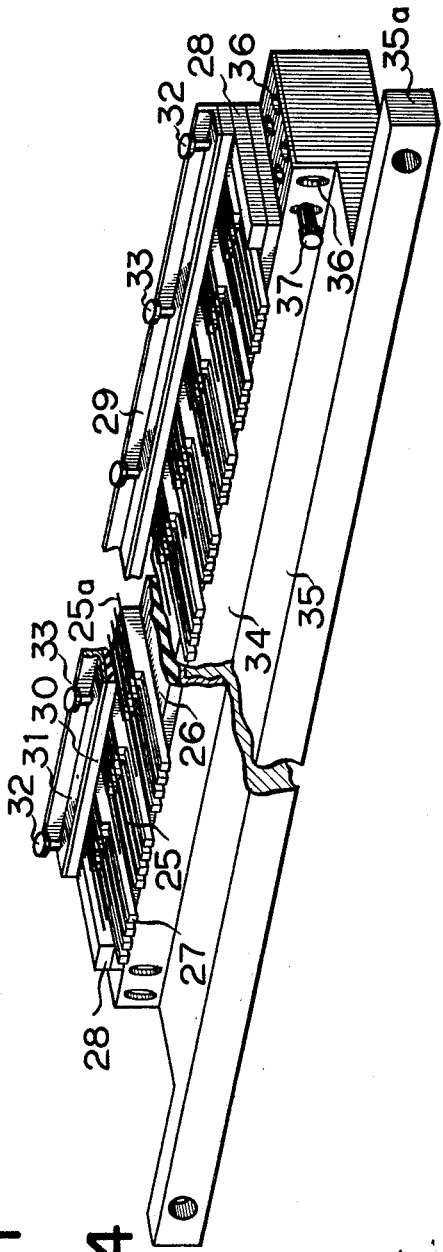
FIG. 4 is a perspective view of a multi-needle electrode assembly.

Referring now to FIG. 1 of the accompanying drawing, a web of a cigarette paper having a width of 1050 mm. for example is wrapped into a roll 14 which is mounted upon a mandrel 13 supported by bearing stands 12. The web of the paper payed out from the roll 14 is fed to a guide roller 16 over a first feed roller 15. Although not shown in the drawing the roller 16 is connected to a small pilot generator which detects the running speed of the paper 11 to adjust the speed. The paper 11 is then supplied to a first set of pinch rollers 19, through a first smoothing roller 17 and a second smoothing roller 18. The crumpled cigarette paper 11 are smoothed out by causing it to pass around the rollers 17 and 18, both ends of which are wound with a strip of paper of the known type. More particularly, as the paper is caused to run at a high speed of 100 meter/min., for example, there would arise a tendency to form crumples due to some mechanical vibration. However, when the diameter of the end portions of the first and second smoothing rollers 17 and 18 is made larger than that of the central portion, by wrapping several convolutions of paper around the periphery of said end portions, the crumpled paper 11 will be smoothed out. From the pinch rollers 19, the paper 11 thus smoothed out is then sent to an electric discharge device 20, the detail thereof will be described later with reference to FIGS. 2 through 7. The electric discharge device 20 comprises a cylindrical electrode 21 of iron, and a first and a second guide rollers 22 and 23 which are positioned on the opposite sides of the cylindrical electrode 21 and at a different height from the cylindrical electrode so that the paper 11 passes around these members along an inverted U-shaped path. For the purpose of description, cylindrical electrode 21 is grounded and shown as being provided with four parallel rows of multi-needle electrode assemblies 24 extending in parallel with the axis of the cylindrical electrode 21. It should be understood that a single multi-needle electrode assembly may of course be used. Each one of the multi-needle electrode assemblies includes 144 needle electrodes 25 made of tungsten, for example, which are supported by a plurality of electric insulating needle supporting members 27 secured on an insulator board 26 as shown in FIG. 4. A leg 28 is secured to each end of the insulator board 26 and a clamping plate 29 is placed on the legs 28 to cover needles lying between these legs. The clamping plate 29 comprises an elongated square column 30 of an insulator such as rubber and a reinforcing angle member 31 of metal fixed to the upper surface of the column. The opposite ends of the clamping plates are secured to the legs 28 by screws 32 engaging threaded openings in the legs. Further, a plurality of screws 33 are inserted in the intermediate portion of the clamping plate 29 to engage threaded openings provided in the insulator board 26. By tightening these screws 32 and 33, needle electrodes 25 interposed between the clamping plate 29 and needle supporting members 27 are secured in position. The insulator board 26 is secured on a metallic angular frame 34. It is necessary to align tips 25a of all needle electrodes 25 on a line parallel to the longitudinal axis of the frame 34. To adjust the position of the needle electrodes an adjusting tool 60 as shown in FIGS. 5 and 6 is used. The adjusting tool 60 illustrated comprises a base 61 having a rectangular cross-section of the height substantially equal to that of one side $34_1$ of the frame 34. Legs 62 are secured on the opposite ends of the base 61 to support a movable plate 63. Slots 64 are provided on both ends of the plate 63 to receive screws 64 received in threaded openings in the legs 62 thus securing the movable plate 63. Further, uniform scales 63a are provided on the opposite end surfaces of the plate 63 to read the extent of movement thereof when it is moved in the direction perpendicular to the longitudinal axis of the plate 63. The arrangement is such that when the front surface 63b of the movable plate 63 is brought to a position parallel with one edge 61a of the upper surface of the base 61 the zero positions of the scales 63a on the opposite ends of the plate 63 will assume the same position. The frame 34 is fixed in position as shown in FIG. 6 when the other side $34_2$ of the frame 34 is mounted on the upper surface 61b of the adjusting tool 60, with its other side $34_1$ faced to the front surface 61c of the base and by inserting screws 67 through slots 36 to engage with threaded openings 66. Under this condition, the inner edge of one side $34_1$ of the frame 34, and the inner sides of the insulator board 26 and of the leg 28 abut against the leg 62. Then the screws 65 are loosened to move the movable plate 63 sufficient to the length of the needle electrodes 25, which are desired to be projected. Thereafter, screws 32 of the clamping plate 29 which hold needle electrodes 25 are loosened. Under this condition, needle electrodes 25 are pushed by any suitable means until their one ends 25a come to abut against the front surface 63b of the movable plate 63. Thereafter screws 32 and 33 are again tightened to secure needle electrodes 25 between the clamping plate 25 and the supporting members 27. The frame 34 can be removed from the base 61 by removing screws 67 and then fastened to a supporting body 35 by screws 27 inserted in slots 36 as shown in FIGS. 3 and 4.

The multi-needle electrode assembly 24 constructed as shown in FIG. 4 is then assembled in a manner shown in FIG. 3. More particularly, a bearing 38 adapted to support the cylindrical electrode 21 is divided into two halves, viz a fixed portion 39 and a portion 41 pivotally secured to a pivot pin 40. The portion 41 is substantially semicircular with four radially extending slots 42 around its periphery, said slots receiving respective ends 35a of the supporting member of the electrode assembly 24. Each slot 42 is closed by a cover plate 43 secured to the peripheral surface 41a of the portion 41 by screws 44. A coil spring 45 is interposed between the cover plate 43 and one end 35a of the supporting member 35 and a screw 46 threaded through the end 35a extends through the spring 45. Accordingly, when the screw 46 is rotated in one direction the end 35a of the supporting member 35 will be pulled toward the cover plate 43 to decrease the gap $d$ therebetween whereas when the screw 46 is rotated in the opposite direction the gap $d$ will be increased with the result that the gap between the outer periphery of the cylindrical electrode 21 and the tip 25a of needle electrodes 25 can be adjusted. As shown in FIG. 2 on the periphery of the grinding roll 47 are fixed numerous resilient radial metal pieces 49 made of spring material and the like. The roll 47 is rotated in the clockwise direction as viewed in FIG. 2 (in the same direction as the cylindrical electrode 21) with the tips of metal pieces 49 contacting against the periphery of the cylindrical electrode 21 to grind the same.

The device for applying high voltage impulses to the multi-needle electrode assembly will now be described by referring to FIG. 7. The alternating current supplied to the source section 51 via a plug 50 is rectified into direct current by means of a rectifier 52 and is then applied to an oscillator 53, amplifiers 54 and high voltage impulse generators 55. The oscillator 53 includes a pair of vacuum tubes 56 and 57 to apply their high frequency output to amplifiers 54 connected in parallel. While triodes are shown as the vacuum tubes utilized in the oscillator 53 and amplifiers 54 they may be substituted by any suitable semiconductor devices. The outputs of the amplifiers 54 are coupled to impulse generators 55 each containing a tetrode thyratron 58. Consequently, the output applied to the impulse generators 55 from amplifiers 54 is derived out from output terminals as a high voltage impulse signal (having a frequency of 1.1 kc. and a voltage of 1,200 v., for example). Although only two output terminals 59 are shown in the drawing, the number of them can be increased or decreased as desired, in which case the number of amplifier 54 and impulse generator 55 is also increased or decreased accordingly.

In this embodiment the same potential is applied to all needle electrodes 25 and in order to avoid voltage drop, 144 needles included in one multi-needle electrode assembly 24 are divided into 36 equal groups and four needles 25 comprising one section are connected to the same conductor. Thus, it will be noted that 36 output terminals 39 are required for each electrode assembly 24.

After adjusting the spacing between the cylindrical electrode 21 and the tips 25a of respective needle electrodes 25 to a definite value, for example 0.2 mm., that is the most suitable value, the high voltage impulse (1.1 kc., 1,200 v.) is applied across the needle electrodes and the cylindrical electrode 21 to create corona discharge, thus perforating small pin holes of true circular configuration through the cigarettte paper 11 passing over the cylindrical electrode 21.

Figure 8:
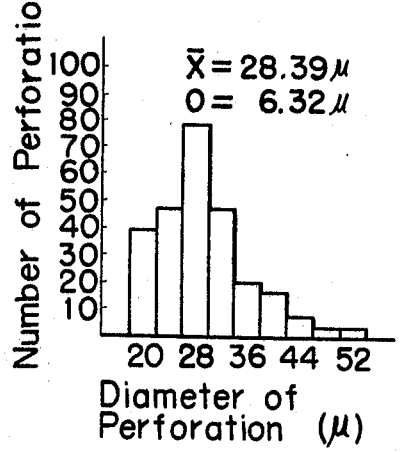
FIGS. 8 through 10 are graphs to show the perforating characteristics of pin holes according to one embodiment of this invention.

FIG. 8 is a graph showing the perforation diameter distribution curve of cigarette papers perforated by the corona discharge provided by the apparatus described above with the ordinate representing the number of perforations and the abscissa the diameter in micron of the perforations. Following Tables 1, 2 and 3 show variation in the physical characteristics of papers before and after perforation as well as deviation of porosity of the perforated papers.

TABLE 1

|  | Hemp 100% 21 g. | | Hemp 50% 22 g. | |
| --- | --- | --- | --- | --- |
|  | Before perforation | After perforation | Before perforation | After perforation |
| Weight per unit area g./m.² | 22.01 | 22.01 | 22.31 | 22.23 |
| Thickness, mm | 0.031 | 0.031 | 0.031 | 0.031 |
| Tensile strength (g.): |  |  |  |  |
| Transversal | 1,622 | 1,644 | 1,862 | 1,878 |
| Lateral | 788 | 758 | 744 | 732 |
| Longitudinal elongation, percent | 1.5 | 1.5 | 1.4 | 1.4 |
| Porosity, cc./min | 83.2 | 269.0 | 65.0 | 255.2 |
| Degree of opaqueness, percent | 78.8 | 78.4 | 77.9 | 78.1 |
| Degree of whiteness, percent | 87.0 | 87.0 | 89.5 | 89.5 |
| Buring speed, sec | 27.1 | 27.1 | 26.1 | 26.1 |
| Flatness: |  |  |  |  |
| Front | 67.3 | 64.5 | 75.7 | 70.1 |
| Rear | 66.0 | 53.9 | 65.4 | 64.1 |

As can be noted from Table 1 physical characteristics of the paper do not change materially before and after perforation.

Table 2 below shows variations in the physical characteristics of a number of samples before and after perforation.

TABLE 2.—BEFORE PERFORATION (HEMP 100% 21 g.)

| Sample | Weight per unit area, g./m.² | Tensile strength, g. | Elongation, percent | Degree of opaqueness, percent | Porosity, cc. |
| --- | --- | --- | --- | --- | --- |
| 1 | 21.89 | 1,624 | 1.6 | 79.4 | 89.6 |
| 2 | 22.04 | 1,728 | 1.6 | 79.4 | 72.0 |
| 3 | 21.52 | 1,752 | 1.7 | 78.8 | 79.2 |
| 4 | 21.70 | 1,564 | 1.5 | 79.2 | 77.6 |
| 5 | 21.70 | 1,600 | 1.5 | 79.7 | 72.8 |
| 6 | 21.96 | 1,686 | 1.5 | 79.7 | 72.8 |
| 7 | 22.11 | 1,585 | 1.6 | 79.4 | 74.4 |
| 8 | 22.04 | 1,582 | 1.5 | 79.5 | 76.0 |
| 9 | 21.85 | 1,508 | 1.5 | 79.4 | 72.0 |
| 10 | 21.63 | 1,600 | 1.6 | 78.9 | 74.4 |
| Average | 21.85 | 1,629 | 1.6 | 79.3 | 76.1 |
| Standard deviation | 0.18 | 72.8 | 0.08 | 0.28 | 5.03 |

AFTER PERFORATION

| Sample | Weight per unit area, g./m.² | Tensile strength, g. | Elongation, percent | Degree of opaqueness, percent | Porosity, cc. |
| --- | --- | --- | --- | --- | --- |
| 1 | 21.96 | 1,638 | 1.5 | 79.7 | 287.0 |
| 2 | 21.26 | 1,572 | 1.7 | 78.8 | 280.0 |
| 3 | 21.67 | 1,606 | 1.7 | 78.5 | 284.0 |
| 4 | 21.22 | 1,588 | 1.6 | 78.4 | 273.6 |
| 5 | 21.56 | 1,638 | 1.5 | 78.7 | 264.0 |
| 6 | 21.63 | 1,626 | 1.6 | 78.9 | 283.6 |
| 7 | 21.48 | 1,588 | 1.5 | 78.7 | 267.2 |
| 8 | 21.74 | 1,626 | 1.6 | 78.7 | 282.8 |
| 9 | 21.78 | 1,614 | 1.5 | 78.8 | 276.4 |
| 10 | 21.85 | 1,540 | 1.5 | 80.5 | 284.8 |
| Average | 21.62 | 1,604 | 1.6 | 79.0 | 277.7 |
| Standard deviation | 0.23 | 30.0 | 0.08 | 0.61 | 6.87 |

As can be noted from Table 2 there is no appreciable difference in the tensile strength and degree of opaqueness before and after perforation.

Table 3 below shows the deviation of the porosity of the perforated cigarette paper.

TABLE 3

| Type of deviation | Absolute value | Relative error, percent |
| --- | --- | --- |
| Interval of perforation and variation in the average porosity | Average, 266 cc./min. ± 5 cc./min. <br> Standard deviation, 13 cc./min | 2 |
| Deviation between rows | Standard deviation, 11 cc./min | 4.1 |
| Deviation in a row | Standard deviation, 8 cc./min | 3 |

"Deviation between rows" in Table 3 means variation in each row when the paper is slitted into a number of rows along the width thereof.

Figure 9:
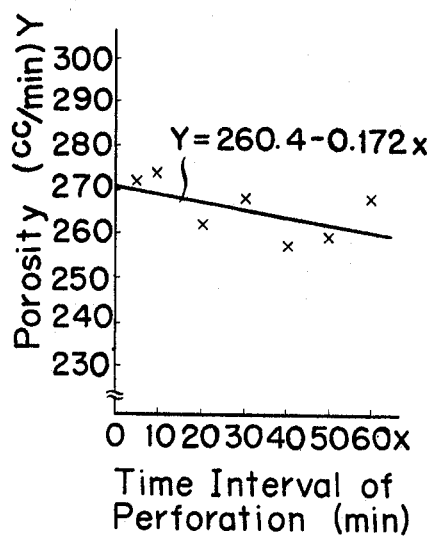
Figure 10:
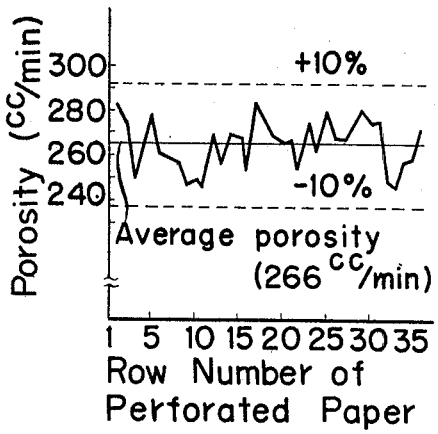

FIG. 9 shows the relationship between time interval of perforation and end variation in the average porosity. The ordinate represents the porosity and the abscissa the time interval of perforation in minutes. FIG. 10 shows the deviation between rows of perforated papers, the ordinate representing the porosity, while the abscissa the row number.

Figure 11:
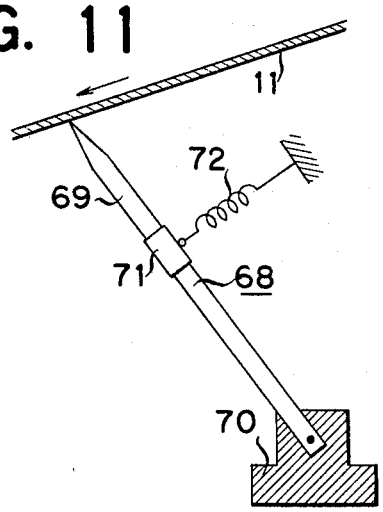
FIG. 11 is a side view of a drawing device to draw a cutting line on a paper.

Referring again to FIG. 1 the perforated paper 11 is fed to a drawing device 68 via the second intermediate roller 23 whereby to draw reference lines on the predetermined portions of the paper for rendering easy alignment of cutter blades and the paper when cutting the paper along its length. As shown in FIG. 11, the drawing device comprises drawing pens 69 urged against the lower side of the paper 11. The lower ends of the pens are pivotally connected to a supporting base 70. A biasing spring 72 is connected to a holding ferrule 71 encircling the pen to urge the tip thereof against the lower surface of the paper to draw a reference line when the paper runs. These reference lines are drawn on the side blanks of the paper which are not perforated. Cutter blades (not shown for slitting the paper are fabricated such that the blades perform cutting along predetermined longitudinal lines when aligning pins (not shown) provided for cutter blades are aligned with said reference lines. The slitted paper is then wrapped on a take up roll 75 after passing through pinch rollers 73 and a guide roller 74.

What is claimed is:

1. Apparatus for perforating a cigarette paper comprising means to rotatably support a roll of a web of a cigarette paper to be perforated, take-up means spaced from said roll of paper to take up said paper, a plurality of smoothing rollers to smooth out the surface of said paper, said smoothing rollers being disposed between said roll supporting means and said take-up means to engage the opposite surfaces of said paper running therebetween; a plurality of pinch rollers to feed said paper; an electrode means including a cylindrical electrode around which said paper passes and at least one multi-needle electrode assembly disposed transversal to the length of said paper, each needle electrode being spaced from the surface of said cylindrical electrode and directed in the radial direction thereof to create electric discharge between said cylindrical electrode and said needle electrodes; and a high voltage impulse generator to impress a high voltage impulse across said cylindrical electrode and said needle electrodes.

2. The perforating apparatus according to claim 1 wherein said high voltage impulse generator comprises an oscillator, a plurality of amplifiers connected in parallel across the output terminals of said oscillator to provide output voltages of equal amplitude, a plurality of impulse generating circuits respectively connected to said amplifiers a source of power for energizing said oscillator, amplifiers and impulse generating circuits and wherein each one of said multi-needle electrode assembly is divided into a plurality of sections each containing equal number of needle electrodes and the output terminal of each of said impulse generating circuit is connected to the corresponding one of said sections.

3. The perforating apparatus according to claim 1 wherein said cylindrical electrode is rotatably supported by bearing means and each one of said multi-needle electrode assemblies is adjustably secured to said bearing means by means of an adjusting mechanism.

4. The perforating apparatus according to claim 3 wherein said adjusting mechanism comprises radial slots provided for said bearing means to receive opposite ends of said multi-needle electrode assemblies, cover plates for closing said slots, adjustable screws engaging said cover plates to secure said multi-needle electrode assemblies and to adjust the distance between said needle electrodes and the periphery of said cylindrical electrode.

5. The perforating apparatus according to claim 4 wherein each one of said multi-needle electrode assemblies comprises an elongated supporting member with its opposite ends received in said slots of the bearing means, an angular frame connected to one side of said supporting member, insulator legs fixed to the opposite ends of said frame, a plurality of needle supporting members made of insulator and disposed on the surface of said frame between said legs, a plurality of needle electrodes respectively supported by said supporting members, a clamping plate made of insulator with its opposite ends secured to said legs to clamp said needle electrodes between said clamping plate and said supporting members.

6. The perforating apparatus according to claim 1 wherein the spacing between the tip of said needle electrodes and the periphery of the cylindrical electrode is about 0.2 mm.

7. The perforating apparatus according to claim 1 wherein said needle electrodes of each of said multi-needle electrode assemblies are divided into a plurality of section containing equal number of needle electrodes and needle electrodes in each section are connected to a common conductor.

8. The perforating apparatus according to claim 1 wherein said cylindrical electrode is rotatably supported and a grinder roll is provided in parallel with said cylindrical electrode, said grinder roll having a plurality of radial resilient metal pieces to grind the surface of said cylindrical electrode when said grinder roll is rotated.

References Cited

UNITED STATES PATENTS

| | | | |
|---|---|---|---|
| 2,550,366 | 4/1951 | Meaker et al. | 219—384 |
| 3,098,143 | 7/1963 | Warmt | 219—384 |
| 3,167,641 | 1/1965 | Parmele et al. | 219—384 |
| 3,348,022 | 10/1967 | Schirmer | 219—384 |
| 3,385,951 | 5/1968 | Bancroft et al. | 219—384 |

FOREIGN PATENTS 1,105,699   4/1961   Germany.

VOLODYMYR Y. MAYEWSKY, Primary Examiner

U.S. Cl. X.R.

313—149